J. W. LAMBERT.
PEDAL LOCKING MECHANISM.
APPLICATION FILED JUNE 9, 1910.
1,014,069.
Patented Jan. 9, 1912.
2 SHEETS—SHEET 1.
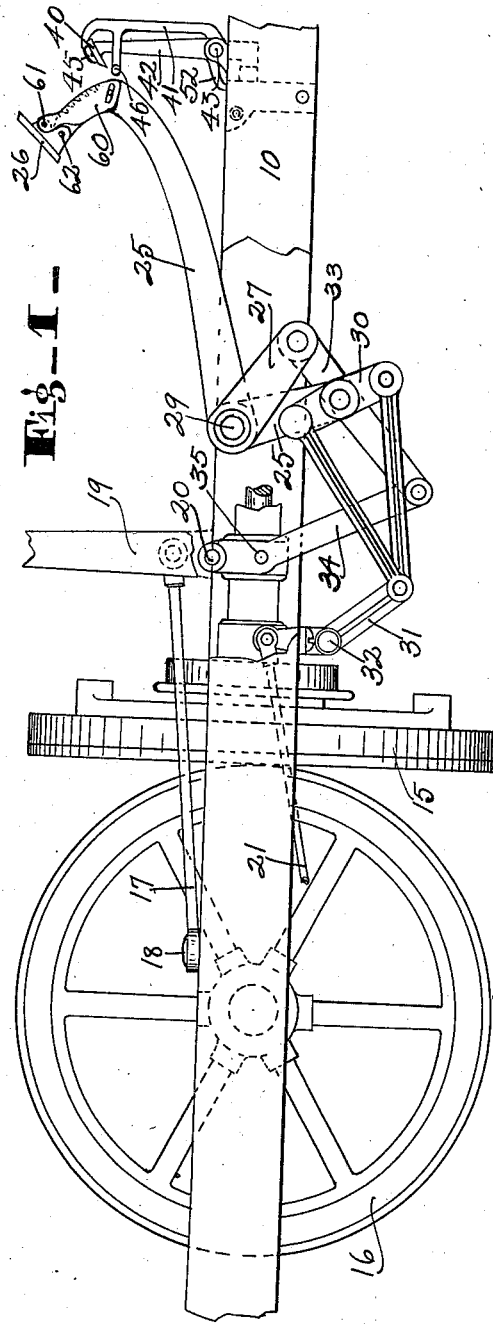
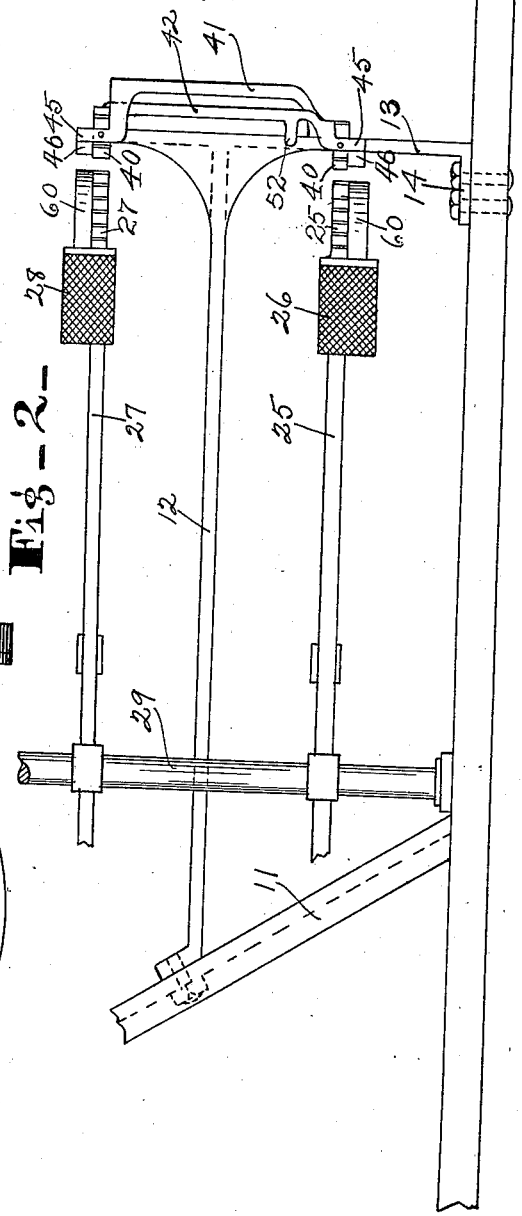
WITNESSES:
INVENTOR.
John W. Lambert
BY
V H Lockwood
ATTORNEY.

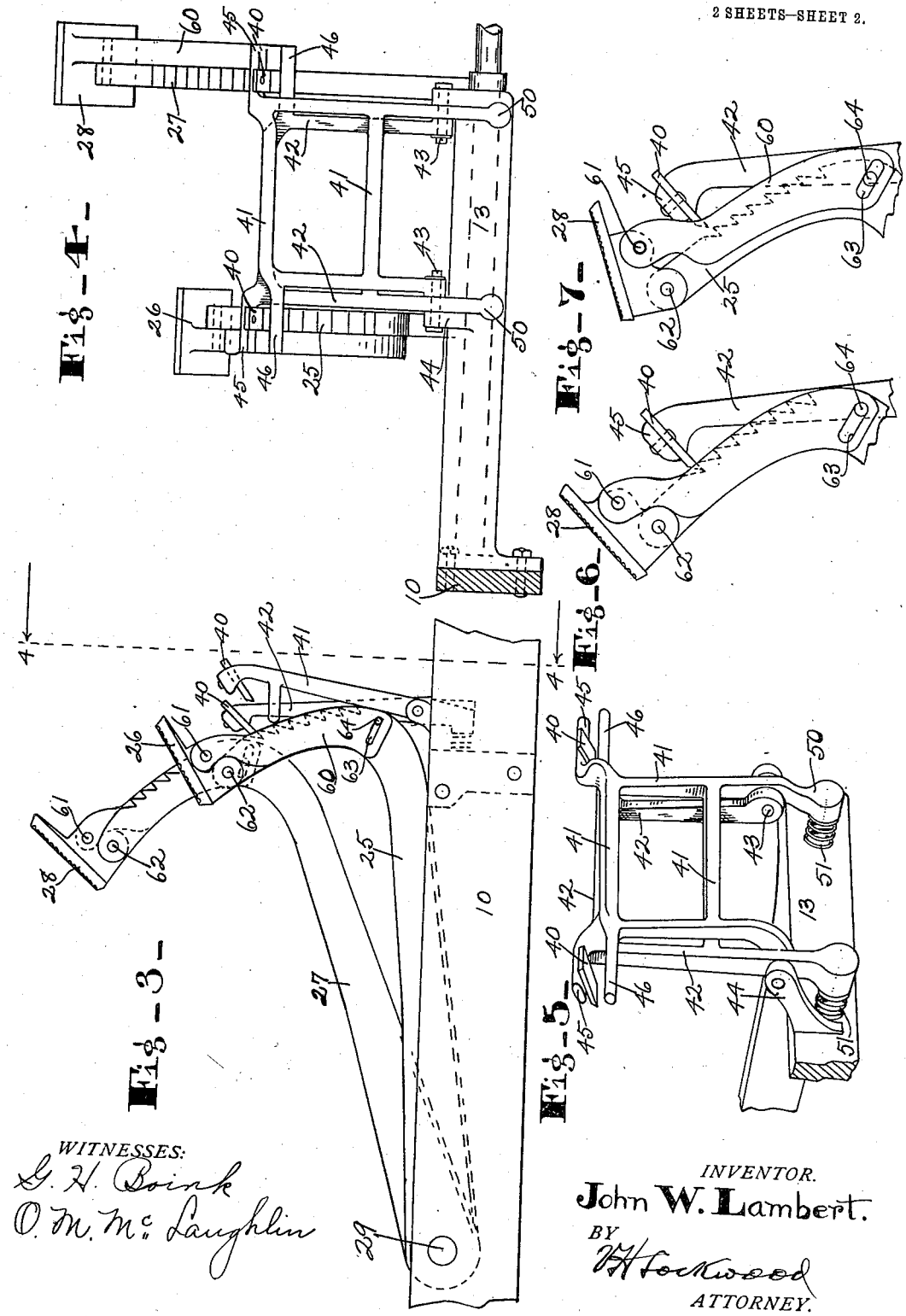

UNITED STATES PATENT OFFICE.

JOHN W. LAMBERT, OF ANDERSON, INDIANA, ASSIGNOR TO THE BUCKEYE MANUFACTURING COMPANY, OF ANDERSON, INDIANA, A CORPORATION OF INDIANA.

PEDAL-LOCKING MECHANISM.

1,014,069.  Specification of Letters Patent.  Patented Jan. 9, 1912.

Application filed June 9, 1910. Serial No. 566,001.

*To all whom it may concern:*

Be it known that I, JOHN W. LAMBERT, of Anderson, county of Madison, and State of Indiana, have invented a certain new and useful Pedal-Locking Mechanism; and I do hereby declare that the following is a full, clear, and exact description thereof, reference being had to the accompanying drawings.

The object of this invention is to provide means in connection with a pair of coöperating pedals whereby the operation of one pedal will unlock the other pedal. Thus in automobiles, the invention enables a person by operating one means both to stop the driving mechanism and to throw on the brake, or, on the other hand, to release the brake and start the driving mechanism.

The nature of the invention will be understood from the accompanying drawings and the following description and claims.

In the drawings Figure 1 is a side elevation of a portion of the chassis of a friction driven automobile showing the friction disks and pedal means for controlling them. Fig. 2 is a plan view of the forward portion of Fig. 1. Fig. 3 is the same as the extreme forward portion of Fig. 1 but on a larger scale and showing one pedal actuated downwardly and locked. Fig. 4 is a view of what is shown in Fig. 3 from the line 4—4 of Fig. 3 which cuts through a part of the frame. Fig. 5 is a perspective view of the locking and releasing means. Figs. 6 and 7 are side elevations of the extreme ends of the pedals and adjacent locking means, showing the pedal operated part in two positions.

In detail, 10 represents the side bar of the frame of an automobile, 11 a diagonal bar, 12 a longitudinal bar secured to the bar 11 and T-shaped at its forward end to furnish a cross frame bar 13, which has an inturned end 14 which is bolted to the frame bar 10. Friction wheels or disks 15 and 16 are shown in the usual position, but the details of their mounting are omitted. It is to be understood that the wheel 15 is a driver and is adjustable longitudinally of the machine in order to control the frictional engagement between it and the driven wheel 16, and likewise the driven wheel 16 is adjustable transversely of the machine in order to modify the speed. This transverse adjustment is effected by a lever 17 fulcrumed at 18 on the frame bar 10 and pivotally connected at its forward end with an upwardly extending hand-lever 19, which is fulcrumed at 20 to the frame. The detailed means whereby the lever 17 moves the wheel 16 transversely is not shown but may be of any usual construction.

The wheel 15 and associated parts are mounted by means not shown, whereby the same is longitudinally movable somewhat and the brake rod 21 is also longitudinally movable for controlling the brake, which, however, is not shown.

Each pedal consists of a bell crank-shaped lever suitably fulcrumed and a pedal plate on the extreme end thereof. The pedal lever 25 may be considered as the brake controlling lever having a brake pedal plate 26 pivoted upon the upturned end thereof, and the lever 27 may be considered the friction or power controlling lever which carries the power pedal plate 28 on the upturned forward end thereof. These two levers are similarly formed and are both mounted on the rod 29 which extends transversely of the frame. The brake lever 25 has a short arm, which is pivoted to the center of a bar 30 which is secured to the ends of two bars which are pivotally connected to the lower end of the bell crank lever 31 fulcrumed to the frame at 32 so that the upper arm thereof is in engagement with the brake rod 21 and gives it longitudinal movement. The lever 27 has a short arm, which is pivoted to a connecting bar 33, which in turn is pivoted to a bell crank lever 34 which is fulcrumed at its upper end at 35 and between its ends engages a forwardly extending portion of the driving disk 15 so that as said pedal is depressed said wheel 15 will be forced toward the wheel 16.

The exact nature of the connection between the two pedal levers and the parts which they operate is not material to this invention excepting to illustrate the use to which the same have been put. The forward surface of the upturned portion of each pedal lever is provided with ratchet teeth adapted to be engaged by sharp beveled detents or plates 40, which are secured to the upper ends of locking frames 41 and 42. These locking frames are similarly but reversely formed and lie against each other; that is, the frame 41 is immediately in front of the frame 42 and both are pivoted near their lower ends on pins 43 in ears 44 extending from the front frame piece 13. The detent 40 is secured to a lateral projection 45 at the left-hand upper end or corner of frame 42, see Fig. 5, while the detent on frame 41 is on the lateral projection 45 at the upper right-hand corner thereof. Each frame is also provided with laterally extending releasing lugs 46. Each frame 41 and 42 has a downwardly extending projection 50, and a spiral spring 51 lies between said projection and the frame plate 13, so that said springs push outwardly on the extensions 50 and tend to force the upper ends of said frames inwardly against the pedal levers. An inwardly extending stop lug 52 on the lower part of frame 42, see Fig. 1, engages the top edge of the frame plate 13 and limits the inward movement of the upper ends of said frames 41 and 42 under the influence of the springs 51.

The upwardly extending forward portion of each pedal lever has a movable releasing bar 60 mounted on the side thereof and pivoted at 61 to the pedal plates 26 or 28 at a point not coaxial with the fulcrum 62 of the pedal plates, so that as the pedal plates are rocked by the foot on the pedal levers, the bars 60 will be pushed downwardly or drawn upwardly, and the lower ends of said bars 60 have slots 63 into which pins 64 from the pedal levers project, said slots being obliquely arranged so that as the bar 60 moves downwardly, the forward face thereof will be pushed forwardly into engagement with the extreme end of the lug 45 to which the detent 40 is secured. Thus, when the pedal lever is locked, as shown in Fig. 6, and it is desired to release the same, the pedal plate is rocked from the position shown in Fig. 6 to that shown in Fig. 7, and that causes a forward movement of the bar 60 against the extreme end of the lug 45, which pushes the upper end of the frame and the detent carried thereby away from the pedal lever, so that the detent ceases to engage the ratchet teeth of the pedal lever. This is the means whereby any single pedal lever can be disengaged without and regardless of the operation of the other pedal lever. Said bar 60 is also in position to engage the lug 46 on the frame that locks the other pedal lever, so that when one pedal lever is actuated, it will release the other pedal lever. Thus by observing Fig. 4, it is seen that the pedal brake lever has been operated or pushed downwardly and it is locked in such downward position. While the brake is in operation the friction drive mechanism is not in operation, and, therefore, the friction pedal is in its elevated or unoperated position. This, for instance, is the position of the parts while stopping or going down hill. But suppose it be desired that the brake be released and that the driving mechanism be thrown into operation. Both of these functions can be accomplished by merely pressing down the friction pedal plate 28, and as it goes down, the bar 60 connected with it will engage the releasing lug 46 of the frame 42 and push it backwardly, moving its detent 40 out of engagement with the brake pedal lever and thus releasing the brake pedal lever, and the opposite result will be accomplished if the friction pedal lever has been actuated and the brake pedal lever is in the unoperated position and it is desired to stop the car. Operation merely of the brake lever will not only set the brake but it will throw the driving mechanism out of operation.

I claim as my invention:

1. The combination of a plurality of pedal levers with forwardly up-turned ends having ratchet teeth thereon, a pedal plate pivoted on the upper end of each pedal lever, a movable locking means for engaging the ratchet teeth and locking each lever when actuated, and means operated by the oscillation of the pedal plate for disengaging said locking means from said pedal lever.

2. The combination of a plurality of pedal levers with forwardly up-turned ends having ratchet teeth thereon, pedal plates pivoted on the upper end of each pedal lever, a movable locking means for engaging the ratchet teeth and locking each lever when actuated, a releasing plate pivoted at its upper end to one side of the fulcrum of said pedal plate and extending down beside the pedal lever, and means on said lever for guiding the lower end of said releasing plate when actuated and causing it to project forwardly beyond the ratchet teeth and engage and release the locking means from the ratchet teeth.

3. The combination of a pair of pedal levers with up-turned forward ends provided with ratchet teeth, and a spring-pressed locking frame provided with means for engaging the ratchet teeth of each pedal lever and locking it when actuated, said locking frames being placed one in front of the other but reversely formed and each provided with a lateral projection at the side remote from its corresponding actuating pedal lever in position to be engaged by the other pedal lever when actuated.

4. The combination of a pair of pedal levers having up-turned forward ends provided with ratchet teeth, a pedal plate pivoted on the upper end of each pedal lever, a releasing plate mounted on the side of the up-turned portion of each pedal lever and pivoted to the pedal plate in front of the fulcrum and arranged so that when not operated said releasing plate will project beyond the teeth of the pedal lever, and a pair of spring-pressed frames located one in front of the other and having at opposite ends locking plates adapted to engage the teeth of the corresponding pedal levers and having lateral projections on both sides in position to be engaged by said releasing plate, whereby each pedal can release itself from its own locking means and each pedal when actuated will release the locking means of the other pedal.

5. The combination of a pair of pedal levers with up-turned forward ends provided with ratchet teeth, a locking frame provided with means for engaging the teeth of each pedal lever and locking it when actuated, said locking frames being placed one in front of the other but reversely formed and each provided with a lateral projection at the side remote from its corresponding actuating pedal lever in position to be engaged by the other pedal lever when actuated, a spring tending to force said locking frames toward the pedal levers, and a stop on one of said frames for limiting said movement.

In witness whereof, I have hereunto affixed my signature in the presence of the witnesses herein named.

JOHN W. LAMBERT.

Witnesses:
GEO. A. NEWTON,
H. L. WOODRUFF.

Copies of this patent may be obtained for five cents each, by addressing the "Commissioner of Patents, Washington, D. C."